United States Patent
Neustadter et al.

(10) Patent No.: US 7,827,308 B2
(45) Date of Patent: Nov. 2, 2010

(54) OPTICAL WAVEKEY NETWORK AND A METHOD FOR DISTRIBUTING MANAGEMENT INFORMATION THEREIN

(75) Inventors: Udo Mircea Neustadter, Ottawa (CA); Steve Joseph Grabner, Ottawa (CA)

(73) Assignee: Alcatel-Lucent Canada Inc., Ottawa, Ontario (CA)

( * ) Notice: Subject to any disclaimer, the term of this patent is extended or adjusted under 35 U.S.C. 154(b) by 1444 days.

(21) Appl. No.: 10/733,327

(22) Filed: Dec. 12, 2003

(65) Prior Publication Data

US 2004/0249976 A1    Dec. 9, 2004

Related U.S. Application Data

(60) Provisional application No. 60/472,782, filed on May 23, 2003.

(51) Int. Cl.
 *G06F 15/173* (2006.01)
(52) U.S. Cl. .................. 709/244; 709/238; 398/14; 398/31
(58) Field of Classification Search ........... 709/238, 709/244; 398/14, 31
 See application file for complete search history.

(56) References Cited

U.S. PATENT DOCUMENTS

| | | | | |
|---|---|---|---|---|
| 5,881,246 | A * | 3/1999 | Crawley et al. | 709/238 |
| 6,483,833 | B1 * | 11/2002 | Jagannath et al. | 370/392 |
| 6,707,795 | B1 * | 3/2004 | Noorhosseini et al. | 370/242 |
| 6,850,524 | B1 * | 2/2005 | Troxel et al. | 370/395.32 |
| 7,231,456 | B1 * | 6/2007 | Chiba et al. | 709/236 |
| 7,469,102 | B2 * | 12/2008 | Lee et al. | 398/79 |
| 2003/0043820 | A1 * | 3/2003 | Goringe et al. | 370/400 |
| 2003/0046427 | A1 * | 3/2003 | Goringe et al. | 709/242 |
| 2003/0058496 | A1 * | 3/2003 | Obeda et al. | 359/124 |
| 2004/0193728 | A1 * | 9/2004 | Doshi et al. | 709/238 |

OTHER PUBLICATIONS

Network and Services Integration Forum (NSIF) Document #SIF-AR-9806-088-R11 (www.atis.org/atis/sif/sifdoc98.htm).
Internet Engineering Task Force (IETF) Request for Comment (RFC) 2328.
Internet Engineering Task Forcej (IETF) Request for Comment (RFC) 2578.
Internet Engineering Task Force (IETF) Request for Comment (RFC) 2370.
Internet Engineering Task Force (IETF) Request for Comment (RFC) 3630.
Internet Engineering Task Force (IETF) draft "draft-udo-ospf-vendatt-00-txt", May 2003.

* cited by examiner

*Primary Examiner*—Thu Nguyen
*Assistant Examiner*—Thomas J Dailey
(74) *Attorney, Agent, or Firm*—IP-MEX Inc.; Victoria Donnelly

(57) ABSTRACT

Optical link related wavekey information and other vendor specific information is distributed in a WDM network using an extension of the standard OSPF routing protocol. The extension makes use of a vendor attribute Link State Advertisement (LSA) which is a new type of opaque LSA. The vendor attribute LSAs include a Vendatt Link State Identifier (ID) field in the LSA header, and a Vendatt Type/Length/Value (TLV) structure. The Vendatt TLV includes a Vendatt-type field identifying the TLV as a Vendatt TLV, and an enterprise code field identifying the vendor whose equipment (node or network element) generates vendor attribute LSAs or is able to receive vendor attribute LSAs by the identified vendor. Vendor attribute LSAs of a specific vendor are designed to be ignored by nodes or network elements of other vendors.

20 Claims, 11 Drawing Sheets

Wavekey Network (detail)

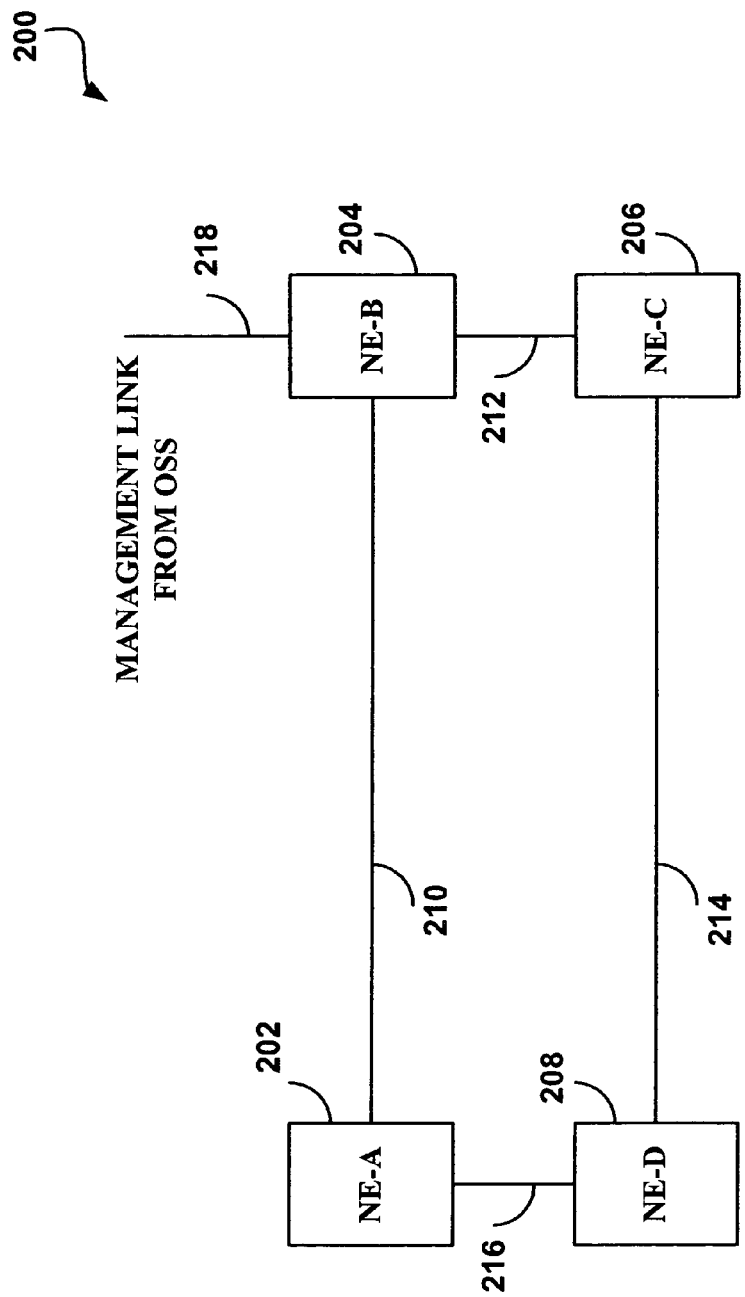
FIG. 2 Wavekey Network

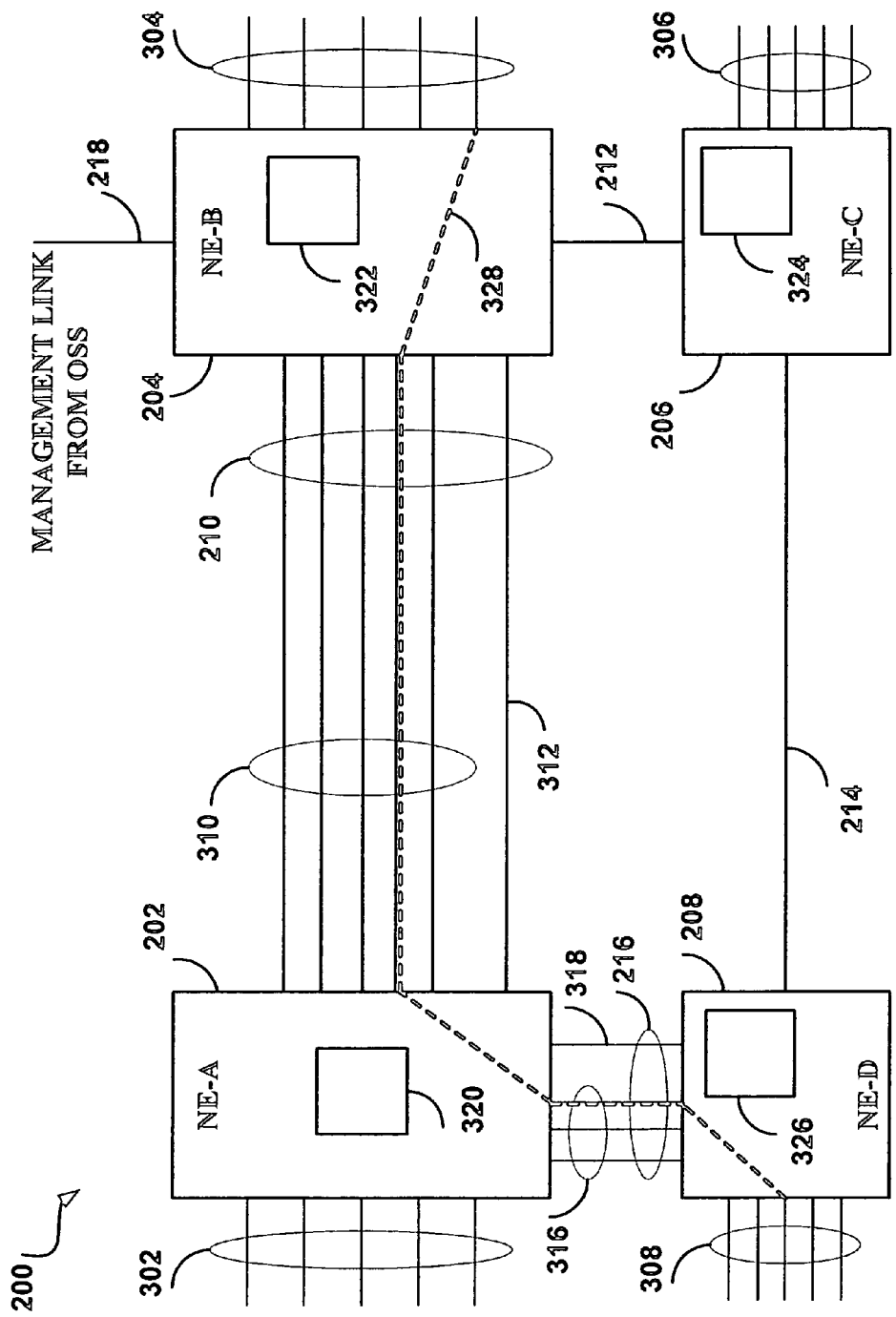
FIG. 3 Wavekey Network (detail)

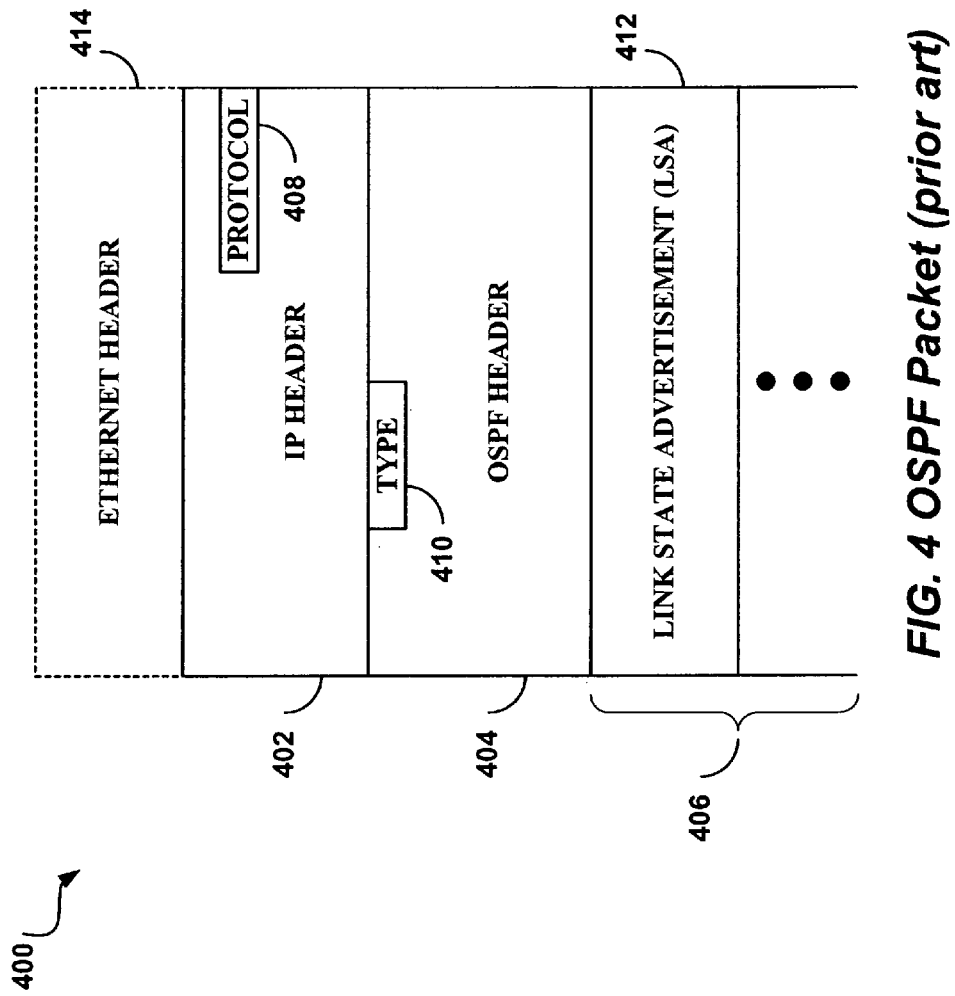
FIG. 4 OSPF Packet (prior art)

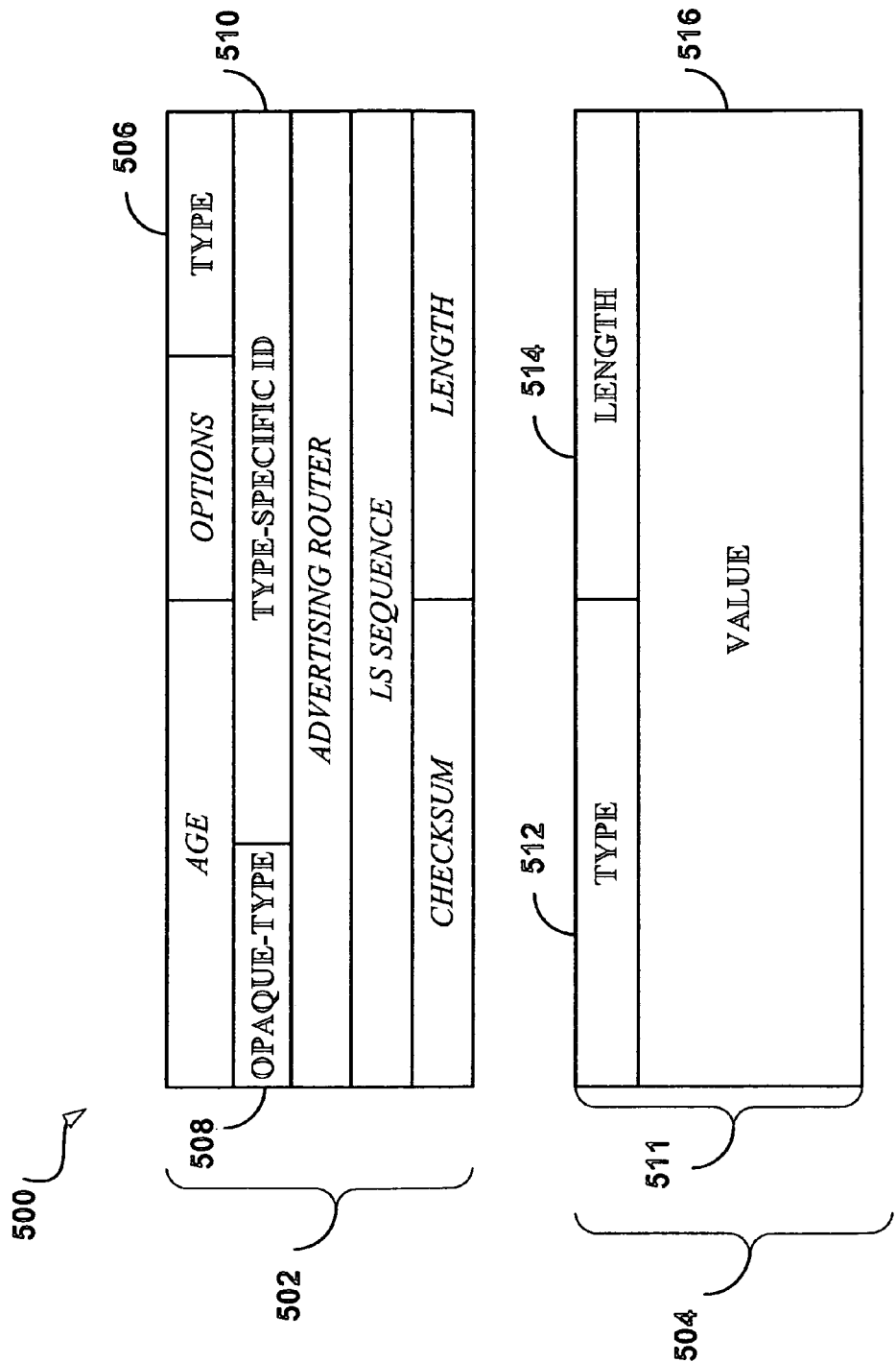
FIG. 5 Traffic Engineering LSA (prior art)

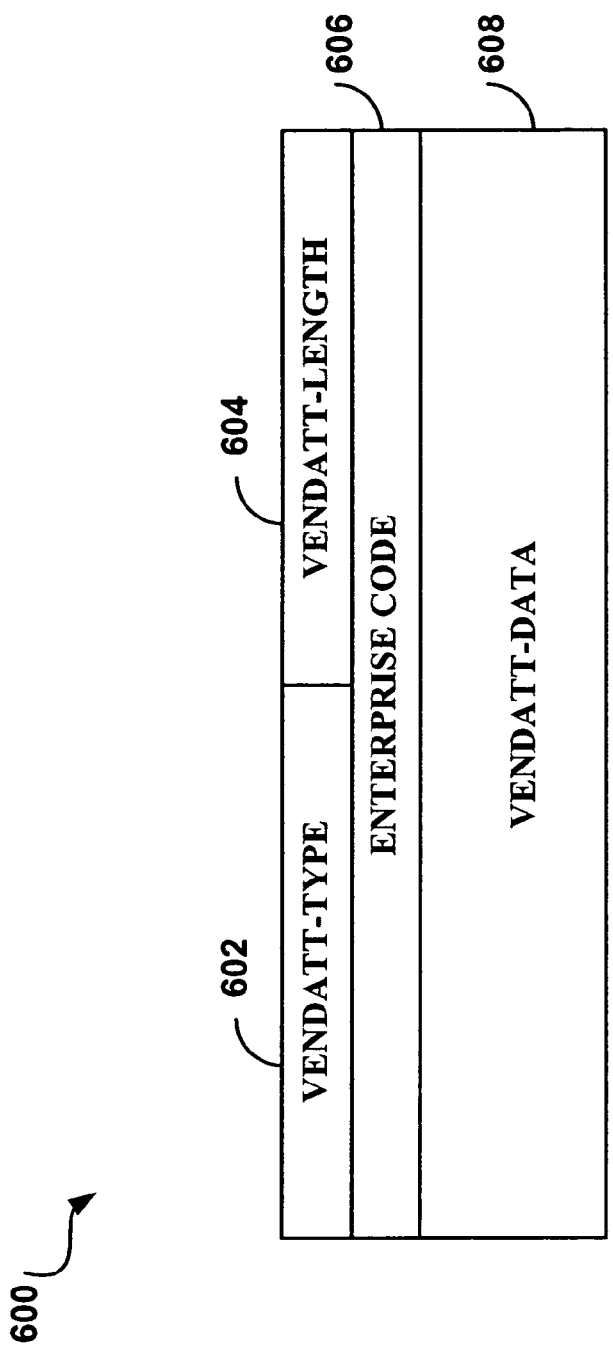
FIG. 6 Vendor Attribute TLV

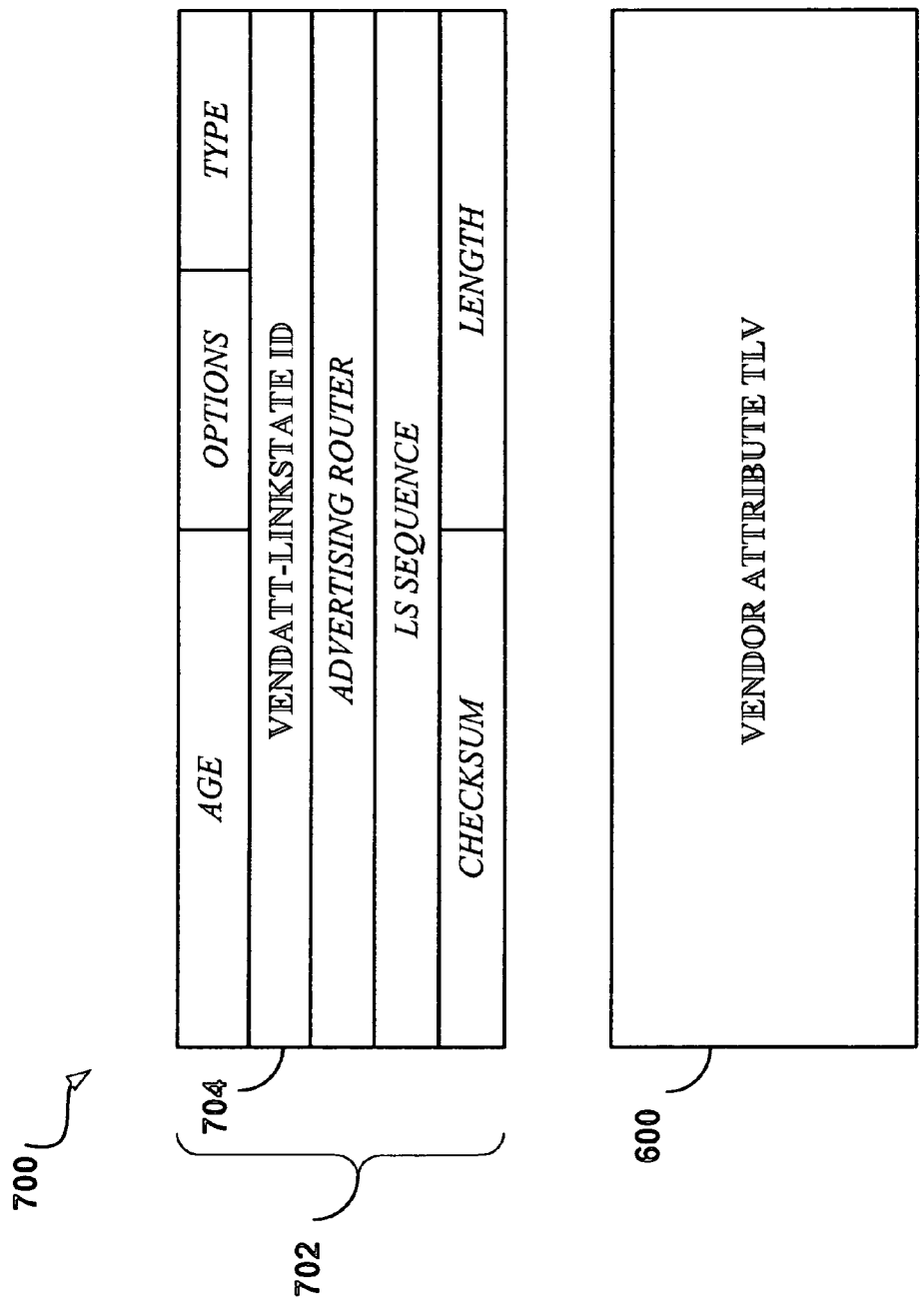
FIG. 7 Vendor Attribute LSA

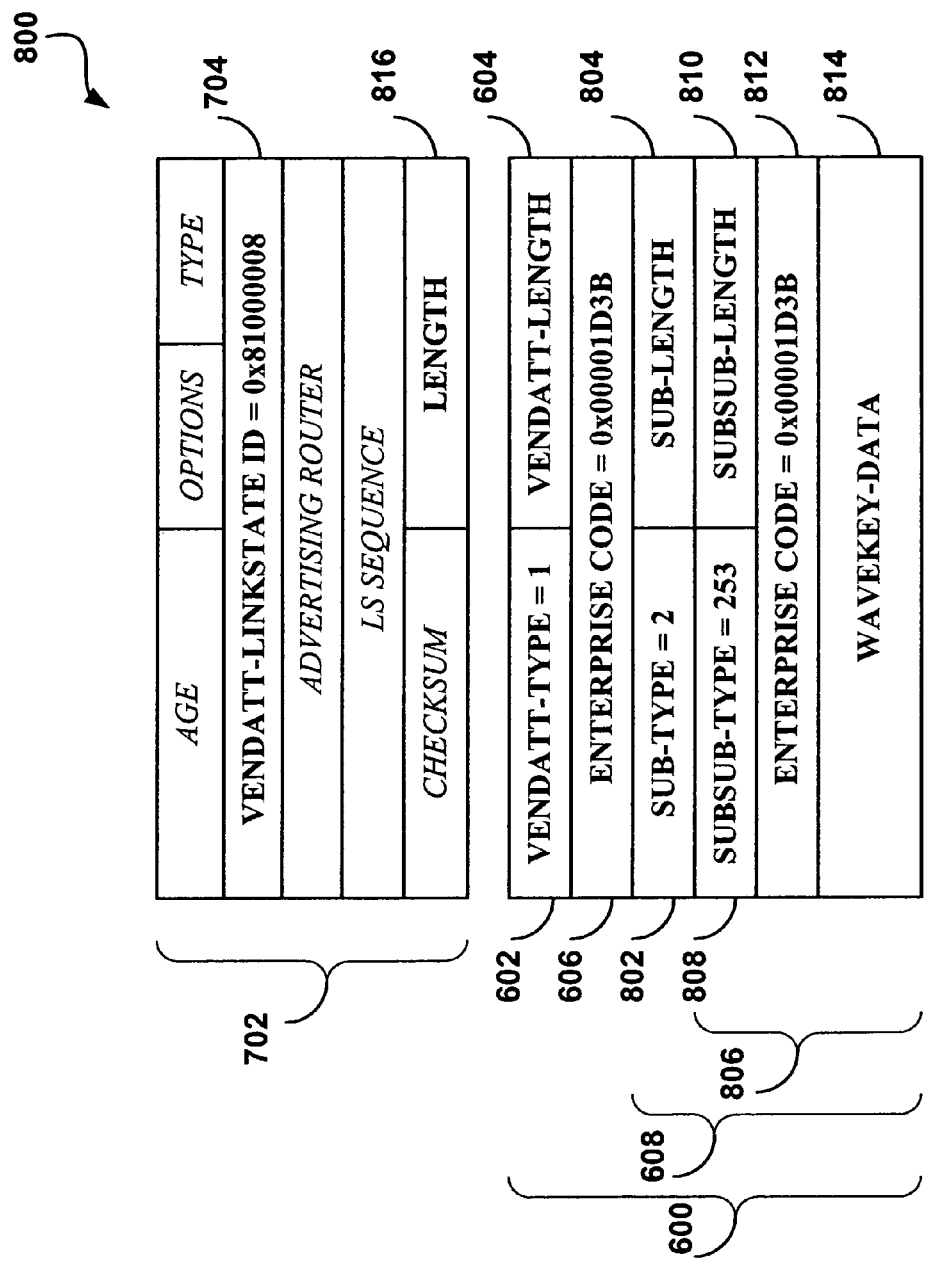
FIG. 8 Wavekey LSA

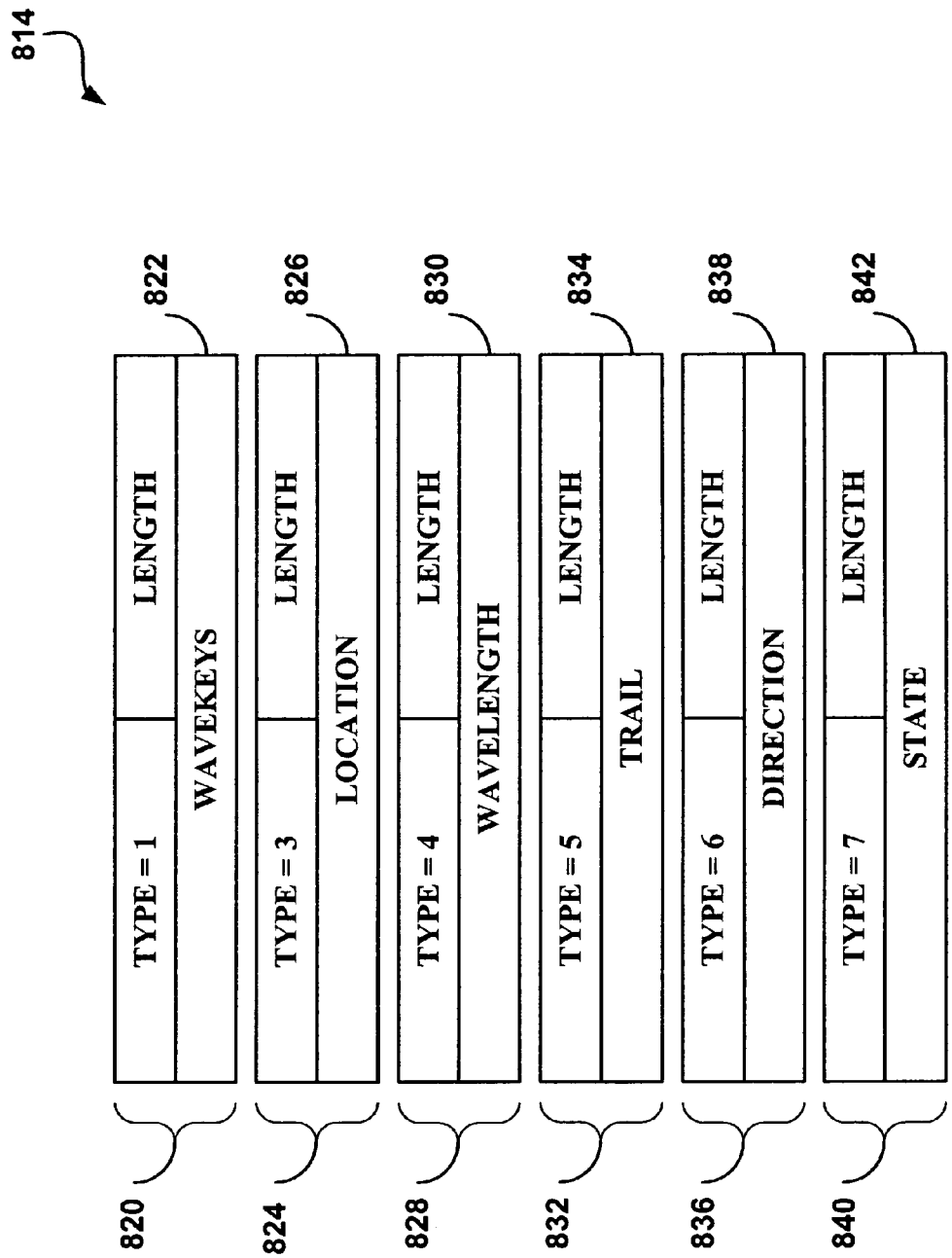
FIG. 9 Wavekey Data

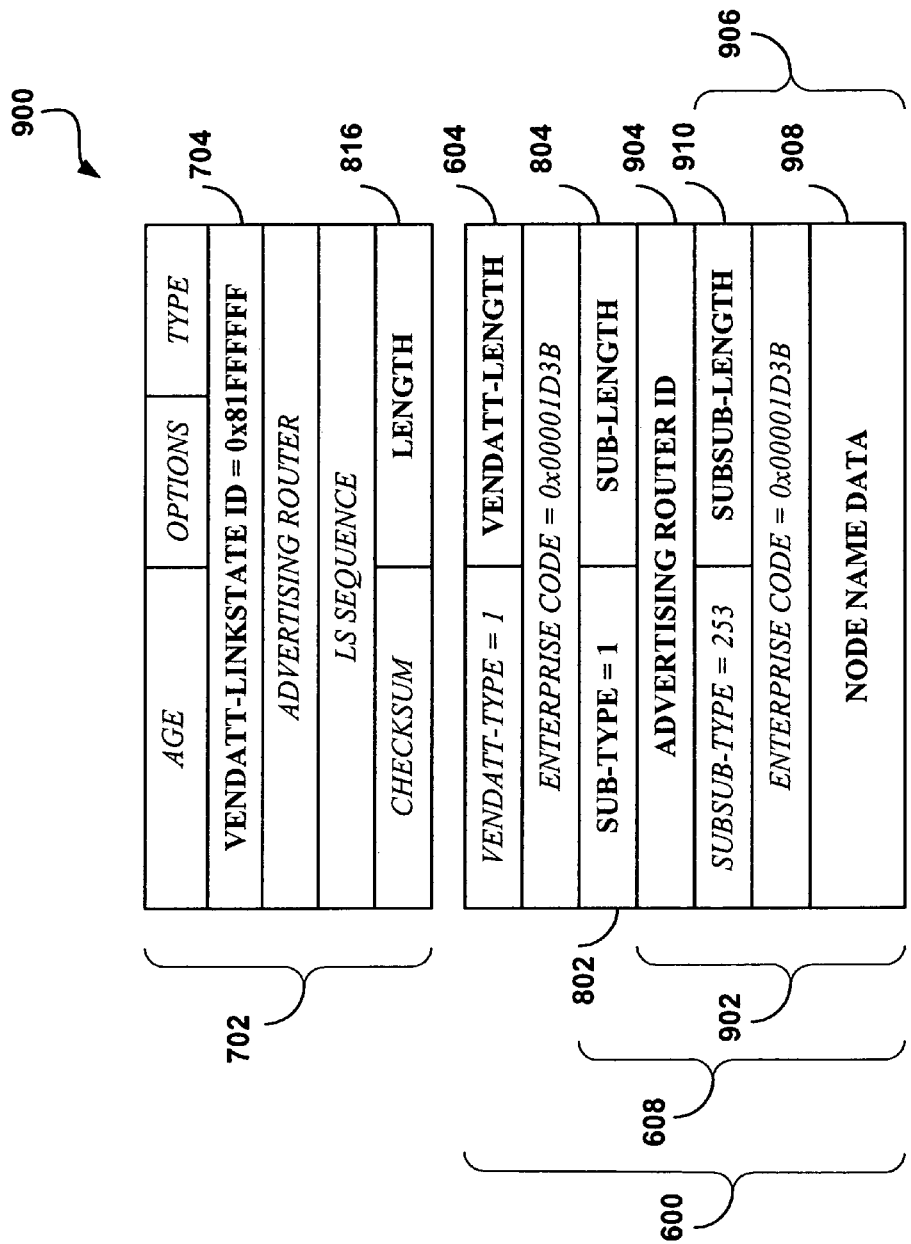
FIG. 10 Node Name LSA

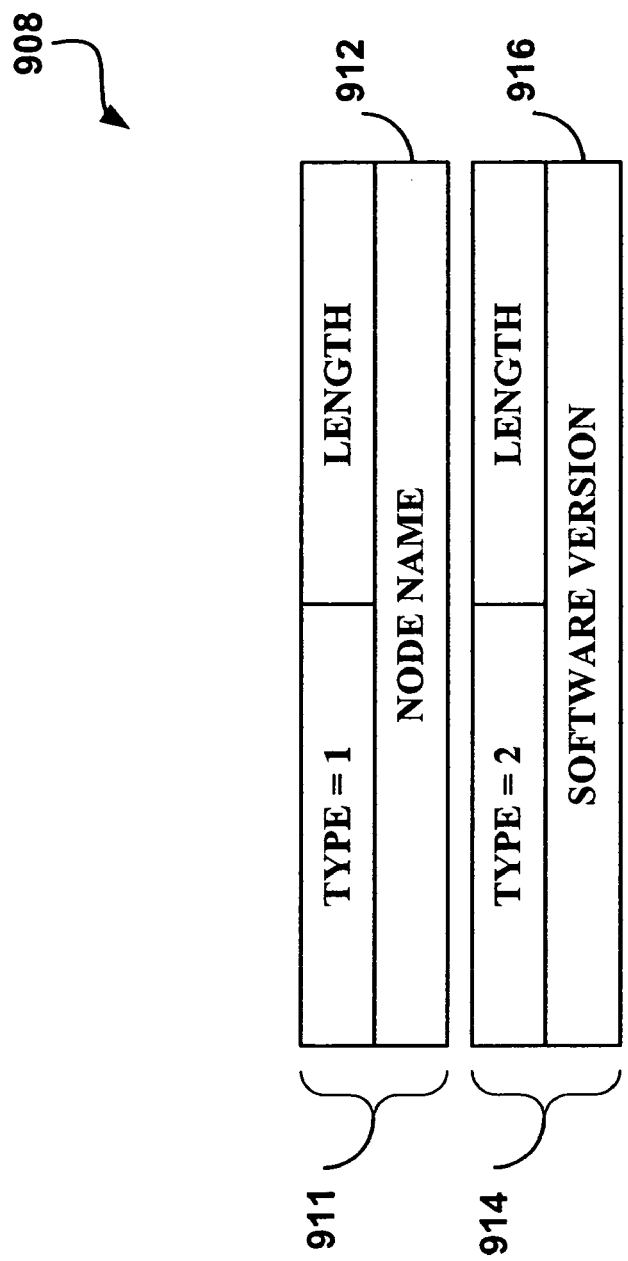
FIG. 11 Node Name Data

OPTICAL WAVEKEY NETWORK AND A METHOD FOR DISTRIBUTING MANAGEMENT INFORMATION THEREIN

RELATED APPLICATION

This application claims benefit from U.S. Provisional Patent Application Ser. No. 60/472,782 to Neustadter, U.M., entitled "Method for Carrying Vendor Specific Data in Open Shortest Path First (OSPF) Traffic Engineering (TE) Link State Advertisements (LSAs)", filed on 23 May 2003.

FIELD OF THE INVENTION

The invention relates to optical WDM networks, and in particular to such networks employing dither tones for channel identification.

DESCRIPTION OF THE RELATED ART

As communications networks become more complex, the task of network management becomes increasingly difficult. An important aspect of a network management system, or NMS, relates to determining and maintaining an accurate record of the topology or connectivity of the network. In optical Wavelength Division Multiplexing (WDM) communications networks this may involve knowledge of not only connections of optical fibers among nodes of the network, but also connections of optical fibers within the nodes, allocation of wavelengths to respective optical fibers, and arrangements and sequences of multiplexers and demultiplexers, or optical band filters, within the nodes. Tropic Networks Inc. U.S. patent application Ser. No. 09/963,501 to Obeda, P. D., et al, filed on 27 Sep. 2001 and entitled "Topology Discovery in Optical WDM Networks", which is included by reference herein, provides an improved method of topology discovery which is particularly applicable to optical WDM networks.

Methods for tracking the topology in the data plane of such optical networks, i.e. the optical links, wavelength channels, and switched connections, may involve the identification of wavelength channels using dither tones. Tropic Networks Inc. U.S. patent application Ser. No. 10/263,959 to Wan, P. W., et al, filed on 4 Oct. 2002 and entitled "Channel Identification in Communications Networks", which is also included by reference herein, provides an improved method of, and apparatus for, channel identification which can facilitate robust detection of dither tones for identification of large numbers of channels in a communications network, particularly an optical WDM network. Tropic Networks Inc. U.S. patent application Ser. No. 10/452,511 to Obeda, P. D., et al, filed on 3 Jun. 2003 and entitled "Method and System for Identification of Channels in an Optical Network", which is also included by reference herein, provides further improvements in the area of flexible, cost-effective, and reliable channel identification in such networks.

The aforementioned methods provide the mechanisms for channel identification and their use in topology discovery in an optical WDM network. A network using these methods will be referred to as a "wavekey network", and its nodes (or network elements) as "wavekey nodes".

The operators of networks often rely on centralized Operational Support Systems (OSS) to manage a number of networks, including optical networks, using a standardized suite of protocols (ISO 8473, LAPD, TP4, TL1) for communicating with the network elements (nodes) of these networks. The optical networks may be Synchronous Optical Network (SONET) networks or other networks.

The concept of network management, using a Data Communications Network (DCN) between the OSS and the managed network, and an Embedded Data Communications Network (EDCN) within the managed network, is described in the Network and Services Integration Forum (NSIF) Document #SIF-AR-9806-088R11. The EDCN in a SONET network utilizes the International Standards Organization (ISO) communications standards, namely TP4, CNLP(ISO 8473), LAPD, etc. The Transaction Language 1 (TL1) is widely used in North America for management of SONET and access infrastructure. TL1 is a man-machine interface that is cross-vendor, cross-technology.

FIG. 1 illustrates an arrangement of networks 100, including an optical WDM network 102 (Network-1) comprising four nodes 104, 106, 108, and 110 (network elements NE-1 to NE-4), a data communications network (DCN) 112, an OSS 114, and other networks 116 (Network-2 to Network-N).

The OSS is linked to the DCN 112 through a data link 118. The DCN 112 is linked to the optical WDM network 102 (Network-1) through two data links 120 and 122 connected to the network elements 104 and 106 (NE-1 and NE-2) respectively, and to the other networks 116 through additional data links 124. The network elements 104 and 106 (NE-1 and NE-2) are also termed "Gateway Network Elements" (GNE).

The four nodes (network elements NE-1 to NE-4) of the optical WDM network 102 are interconnected with WDM links 126, each WDM link 126 comprising a number of lambda-channels.

The optical WDM network 102 may be a SONET network, that is a network where the wavelengths (lambda channels) of each WDM link carry optical signals formatted according to the SONET standard. The centralized OSS 114 is designed to handle the NEs of a SONET network, including the identification of NEs, their properties and status, and the connectivity of the lambda-channels (each lambda channel being in effect a SONET channel) through the network.

The SONET format includes overhead channels, among them a Section Datacom Channel and a Line Datacom Channel. The Datacom channels may be conveniently used to convey network management information between the NEs. The OSS 114 has access to the Datacom channels through the data link 118, via the DCN 112 and the data links 120 and 122, and thus through the nodes 104 and 106 (network elements NE-1 and NE-2). The OSS is thus capable of communicating with every SONET node in the optical WDM network 102. Through the nodes 104 and 106, the OSS 114 further has access to the Section and a Line Datacom Channels of the SONET formatted lambda-channels of the WDM links 126 in the optical WDM network 102. The SONET path carries a J1 bytes, which continuously transmits a repeating 64 bytes string used to verify continuity of the path while the Section Datacom Channels for example are commonly used to carry a text based "path name" from node to node, enabling the OSS to determine the integrity and continuity of a path (also termed a "trail").

On the other hand, an optical WDM network may not be a SONET network, but a new type of optical packet network, for example a wavekey network.

A wavekey network has a number of advantages over a SONET network, primarily in lower hardware cost, more efficient carriage of user packet data (no SONET overhead), and also in other respects, for example the operator of the network may find it easier to obtain employees having the technical skills for maintaining and operating a network that is based on packet technology rather than SONET technology.

It is desirable that a wavekey network be able to function in the role of one of the networks of FIG. 1, but this is only possible if there is a way to manage the wavekey network from the common OSS. However, lacking the SONET overhead channels, the wavekey network is not directly compatible with the existing OSS.

Thus, it is necessary to develop new methods of managing the wavekey network so that it is compatible with the OSS.

SUMMARY OF THE INVENTION

It is an objective of the present invention to provide an extension to the existing network protocol, which would be capable to distribute optical link related wavekey information and other vendor specific information in a wavelength division multiplexing (WDM) network.

According to one aspect of the invention there is provided an Open Shortest Path Found (OSPF) packet of an OSPF protocol used in a network having a plurality of nodes connected by optical links, the OSPF packet comprising an opaque Link State Advertisement (LSA), the LSA including:

an LSA header having a single Vendatt Link State Identification (ID) field instead of the Opaque Type and the Type-Specific ID fields of a standard LSA header; and a set of Vendor Attribute Type/Length/Value (TLV) fields, the Value field including an Enterprise Code field and a Vendatt-Data section, and the Type field being a Vendatt-Type field indicating the presence of the Enterprise Code field in the Value field;

the Vendatt Link State ID field of the LSA header indicating the presence of the set of Vendor Attribute TLV fields.

The Vendatt Link State ID field of the LSA header has a numerical value, which is designed not to conflict with the numerical values of the Opaque Type and the Type-Specific ID fields of a standard LSA header. The numerical value of the Vendatt Link State ID field indicates the presence of Vendor specific link related information in the Vendatt-Data section of the set of Vendor Attribute TLV fields.

The numerical value of the Vendatt Link State ID field indicates the presence of Vendor specific node related information in the Vendatt-Data section of the set of Vendor Attribute TLV fields. Preferably, the Vendor specific link related information is a wavelength division multiplexing (WDM) link related information comprising one or more of the following:

frequencies of dither tones (a wavekey) modulated onto a wavelength of the WDM link;

a location field listing the physical shelf, card slot, and port location of the node terminating the WDM link;

a wavelength identifier of the wavelength of the WDM link;

a path name (trail name) assigned to the wavelength of the WDM link;

a direction of the WDM link; and a working state of the wavelength of the WDM link.

Conveniently, the Vendatt-Data section comprises a sub-TLV field, the sub-TLV field comprising a sub-sub set of Vendor Attribute TLV fields, which contains said Vendor specific link related information.

Alternatively, the Vendor specific node related information may comprise one or more of the following:

a Node Name which includes a text string bearing the name of the node; and a Software Version which includes a text string characterizing the current software load of the node.

Conveniently, the Vendatt-Data section comprises a sub-TLV field, the sub-TLV field comprising a sub-sub set of Vendor Attribute TLV fields, which contains said Vendor specific node related information.

Additionally, the sub-TLV field may comprise an Advertising Router ID field.

According to another aspect of the invention there is provided a protocol for distributing vendor specific information for a WDM optical network based on the Open Shortest Path Found (OSPF) protocol, wherein the OSPF protocol is extended to provide an OSPF packet, the OSPF packet comprising an opaque Link State Advertisement (LSA), the LSA including:

an LSA header having a single Vendatt Link State Identification (ID) field instead of the Opaque Type and the Type-Specific ID fields of a standard LSA header; and a set of Vendor Attribute Type/Length/Value (TLV) fields, the Value field including an Enterprise Code field and a Vendatt-Data section, and the Type field being a Vendatt-Type field indicating the presence of the Enterprise Code field in the Value field;

the Vendatt Link State ID field of the LSA header indicating the presence of the set of Vendor Attribute TLV fields.

The Vendatt Link State ID field of the LSA header has a numerical value, which is designed not to conflict with the numerical values of the Opaque Type and the Type-Specific ID fields of a standard LSA header. The numerical value of the Vendatt Link State ID field indicates the presence of Vendor specific link related information in the Vendatt-Data section of the set of Vendor Attribute TLV fields.

The numerical value of the Vendatt Link State ID field indicates the presence of Vendor specific node related information in the Vendatt-Data section of the set of Vendor Attribute TLV fields.

Beneficially, the Vendor specific link related information is a wavelength division multiplexing (WDM) link related information comprising one or more of the following:

frequencies of dither tones (a wavekey) modulated onto a wavelength of the WDM link;

a location field listing the physical shelf, card slot, and port location of the node terminating the WDM link;

a wavelength identifier of the wavelength of the WDM link;

a path name (trail name) assigned to the wavelength of the WDM link;

a direction of the WDM link; and a working state of the wavelength of the WDM link.

Conveniently, the Vendatt-Data section comprises a sub-TLV field, the sub-TLV field comprising a sub-sub set of Vendor Attribute TLV fields, which contains said Vendor specific link related information.

Alternatively, the Vendor specific node related information may comprise one or more of the following:

a Node Name which includes a text string bearing the name of the node; and a Software Version which includes a text string characterizing the current software load of the node.

Conveniently, the Vendatt-Data section comprises a sub-TLV field, the sub-TLV field comprising a sub-sub set of Vendor Attribute TLV fields, which contains said Vendor specific node related information. Additionally, the sub-TLV field may comprise an Advertising Router ID field.

According to yet another aspect of the invention there is provided a method for distributing wavelength identification information for a WDM optical network using a known routing protocol, where the known routing protocol is extended to provide a packet for transmitting vendor specific information related to wavelength identification, the packet comprising a Vendatt-type field, a Vendatt-length field, an Enterprise Code field, and a Vendatt-data section, wherein the Vendatt-Data section includes the wavelength identification information to be distributed.

Preferably, the known routing protocol is the OSPF protocol, and the packet includes a Link State Advertisement (LSA), comprising a set of Type/Length/Value (TLV) fields including said Vendatt-type, Vendatt-length, Enterprise Code fields, and the Vendatt-data section.

According to one more aspect of the invention there is provided a WDM optical network, using a protocol for distributing wavelength identification information for the WDM optical network, the protocol being based on a known routing protocol, which is extended to provide a packet for transmitting vendor specific information related to wavelength identification, the packet comprising a Vendatt-type field, a Vendatt-length field, an Enterprise Code field, and a Vendatt-data section, wherein the Vendatt-Data section includes the wavelength identification information to be distributed.

Beneficially, the known routing protocol is OSPF, and the packet includes a Link State Advertisement (LSA), comprising a set of Type/Length/Value (TLV) fields, including said Vendatt-type, Vendatt-length, Enterprise Code fields, and the Vendatt-data section.

BRIEF DESCRIPTION OF THE DRAWINGS

The invention will now be described in greater detail with reference to the attached drawings, in which:

FIG. 2 illustrates a wavekey network 200 according to an embodiment of the invention;

FIG. 3 shows the wavekey network 200 of FIG. 2 in greater detail;

FIG. 4 is an illustration of a typical OSPF packet 400 according to the prior art;

FIG. 5 is an illustration of a Traffic Engineering (TE) Link State Advertisement (LSA) (TE-LSA) 500 of the prior art;

FIG. 6 shows a Vendor Attribute Type/Length/Value (TLV) 600 according to an embodiment of the invention;

FIG. 7 shows a Vendor Attribute LSA 700 according to an embodiment of the invention;

FIG. 8 shows a Wavekey LSA 800 according to an embodiment of the invention;

FIG. 9 shows a wavekey data section 814 of the Wavekey LSA 800 of FIG. 8;

FIG. 10 shows a Node Name LSA 900 according to an embodiment of the invention; and FIG. 11 shows a node name data section 908 of the Node Name LSA 900 of FIG. 10.

DETAILED DESCRIPTION OF THE PREFERRED EMBODIMENTS

Figure 1:
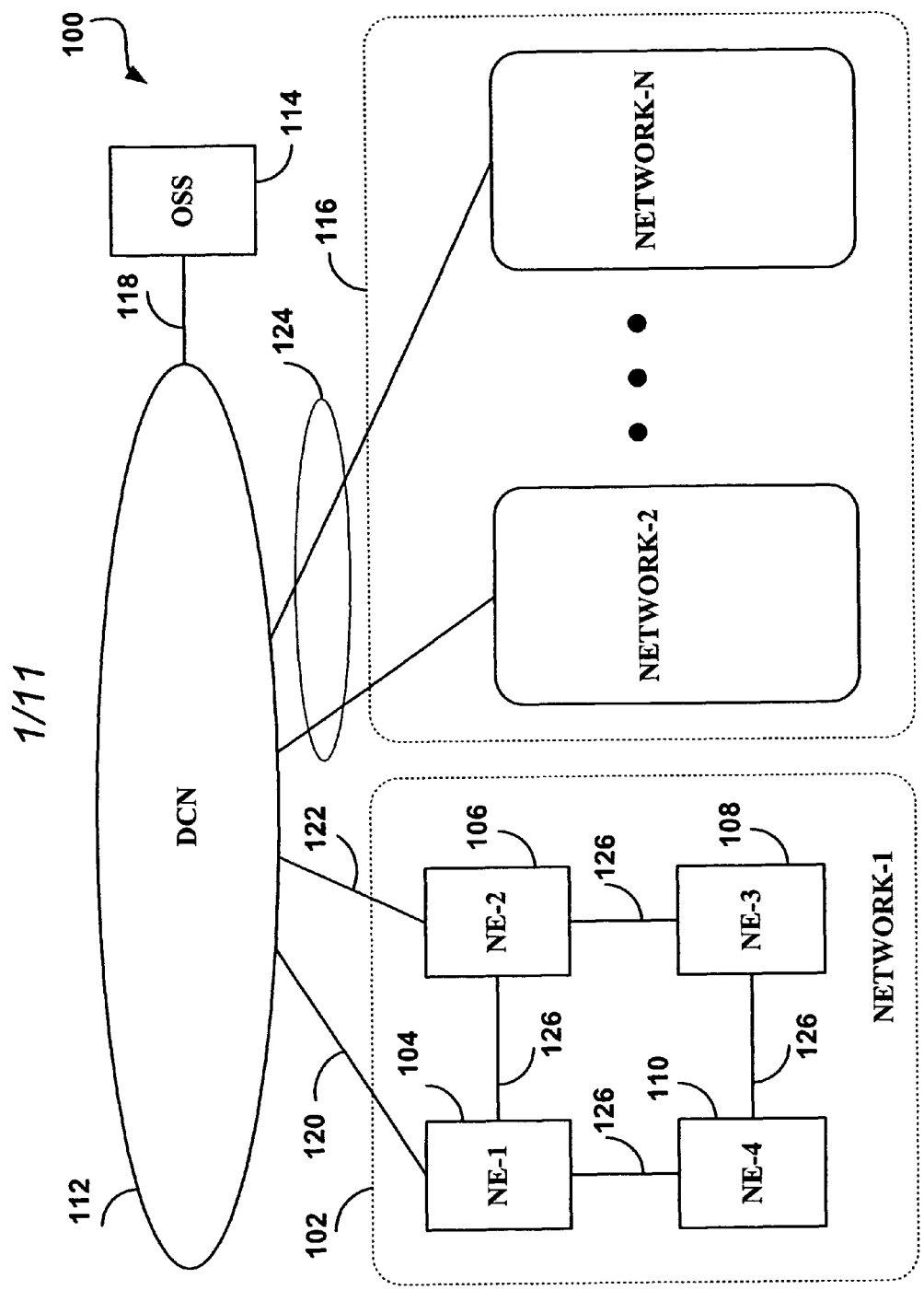
FIG. 1 illustrates an arrangement of networks 100 according to the prior art.

FIG. 2 illustrates a wavekey network 200 according to an embodiment of the invention.

The wavekey network 200 comprises four network elements (NE-A to NE-D) 202, 204, 206, and 208. Each of the NEs 202-208 is a wavekey node.

The NEs 202-208 are interconnected in a ring, with Wavelength Division Multiplex (WDM) links connecting adjacent NEs as follows: WDM link 210 links NEs 202 and 204; WDM link 212 links NEs 204 and 206; WDM link 214 links NEs 206 and 208; and WDM link 216 links NEs 208 and 202.

The wavekey network 200 is connected to an OSS (not shown) via a management link 218 from the NE 204.

One purpose of the invention is to enable the wavekey network 200 to be administered from the OSS.

A solution might be to upgrade the OSS to make it compatible with the features of the wavekey network. But this would require a considerable amount of work and delay in establishing compatibility, and is thus not feasible in the short term.

Conversely, compatibility between the OSS and the wavekey network 200 may be achieved by utilizing the special capabilities of the wavekey network 200 to provide functions that are analogous to those provided by the SONET standard for managing the lambda-channels of an optical WDM network.

At the same time, a lower cost development is achieved if it is largely based on existing protocols and capabilities, and extends these as necessary. One such existing protocol is the Open Shortest Path Found (OSPF) protocol commonly used in routed data networks [Internet Engineering Task Force (IETF) document RFC 2328]. The OSPF protocol provides a reliable method for distributing routing information (so called Link State Advertisements or LSAs) in an Internet Protocol (IP) network.

A well-known result of using the OSPF protocol for the distribution of information among the nodes of a network is, that every node has exactly the same information about itself and every other node. In other words, there is a database of information, and every node has a complete copy of the database. A LSA describes properties (the link state) of a link between the nodes of a network. In a routed network, link states and their changes are immediately distributed to all other nodes, thus each node has up-to-date information about all links in the routed network (within the delay constraints imposed by the protocol and the node-to-node communication).

However, the OSPF protocol is not used by the OSS to communicate with network elements. The OSS uses a protocol suite comprising the standard TP4 protocol, and is based on the standard TL1 language.

The OSS to GNE communication (through the DCN) is typically TL1 over TCP/IP. In a SONET network the GNEs terminate the TCP session and launch TL1 over TP4/CNLP sessions for each activated Target Identifier (TID) [NSIF Document #SIF-AR-9806-088R11]. Briefly, the invention is based on using the OSPF protocol with an enhancement for distributing information among the nodes (network elements 202-208) of the wavekey network 200, while interfacing to the OSS using the standard TL1 language through a TL1 gateway node. In FIG. 2, the NE 204 is designated as a TL1 gateway node.

Consequently, by using the OSPF protocol in the wavekey network 200 the TL1 gateway node 204, the TL1 gateway node 204 will be in possession of all distributed information. Thus an interrogation from the OSS to the TL1 gateway node 208 is able to extract information about any of the network elements 202-208 in the wavekey network 200 where that information is distributed within the wavekey network through the OSPF protocol, and where the TL1 gateway node 204 comprises means to adapt (translate) the format of the information to the TL1 language as required.

However, the existing OSPF protocol is only defined for distributing specific types of information in LSAs. To allow the OSPF protocol to be used for distributing information that is wavekey network specific, or other similar vendor specific information, the OSPF protocol must be extended.

An embodiment of the invention will now be described in detail, including a wavekey network, and the specific extensions to the OSPF protocol to carry new types of LSA, suitable for encoding wavekey information and other information that is vendor specific.

Wavekey Network

The wavekey network 200 of FIG. 2, is shown in greater detail in FIG. 3.

The network element NE-A 202 has a number of access ports 302; similarly, the network elements (NE) 204, 206, and 208 each have a number of access ports 304, 306, and 308 respectively.

The WDM link 210 comprises a number of lambda-channels divided into a group of user data channels 310 and a control channel 312. As is common in WDM systems, each lambda-channel in a link utilizes a different optical wavelength (lambda), but shares a common fiber (the WDM link 210). In addition, specific to this embodiment, each lambda channel is encoded with dither tones as described in Tropic Network Inc. U.S. patent application Ser. No. 10/452,511 filed on 3 Jun. 2003 (noted in Paragraph No. 4 above) The data signal of the control channel 312 preferably follows the Ethernet standard and comprises Internet Protocol (IP) packets.

The WDM link 216 similarly comprises lambda-channels divided into a group of user channels 316 and a control channel 318. The WDM links 212 and 214 are similarly constructed (not shown in detail).

The network elements (NE-A to NE-D) 202 to 208 further include controllers 320 to 326 respectively.

The control channel 312 of the WDM link 210 provides a data connection between the controller 320 of NE-A 202 and the controller 322 of the NE-B 204. The control channels of the other links similarly provide data connections between the associated controllers, forming an IP network in a known manner, including the use of the OSPF protocol. The IP network is a control network of the wavekey network 200.

The user data channels (examples 310 and 316) of the WDM links (210 to 216), of the wavekey network 200, together with the NEs 202 to 208, provide a transport network between the access ports 302 to 308, to carry data between users that are attached to the network. Shown in a dashed heavy line is a single exemplary connection 328 between one of the access ports 304 of the NE-B 204, and one of the access ports 308 of the NE-D 208, and passing through the NE-A 202. The connection 328 is also known as a path 328. Each path in the wavekey network 200 is assigned a wavekey (set of dither tones), as described in Tropic Network Inc. U.S. patent application Ser. No. 10/452,511 filed on 3 Jun. 2003 (noted in Paragraphs No. 4 and 86 above).

Generally, the controllers (320-326) set up connections within each node, and communicate over the control channels of the WDM links (210-216) to set up paths between the access ports (302-308) of the wavekey network 200 in a known manner.

In the case of the exemplary path 328, the controller 326 in the NE-D 208 (for example) further assigns a wavekey to the path 328. Because each wavekey used in the wavekey network 200 is preferably unique, the controller 326 must have the information about wavekeys that are already in use, not only on paths crossing the NE-D 208, but in all NEs of the wavekey network 200. The OSPF protocol running in the controllers 320-326, and communicating over the control channels of the WDM links (210-216), is exploited to maintain a common database of wavekeys that are in use. The extension proposed to the OSPF protocol to enable it to carry wavekey information is described further below.

TL1 Gateway

The node (NE-B) 204 of the wavekey network 200 terminates the management link 218 to the OSS (not shown). The NE 204 is also known as a TL1 gateway 204. TL1 is a standard control language, commonly used by network operators for administering network elements. The management link 218 thus carries TL1 commands from the OSS to the wavekey network 200, and provides responses back to the OSS. The controller 322 of the NE 204 (the TL1 gateway 204) includes the additional functionality to interpret TL1 commands and provide responses. In this way, a connection (the path 328 for example) may be set up as a result of a TL1 command received over the management link 218 from the OSS by the TL1 gateway 204.

However, the repertory of TL1 commands from the OSS does not include wavekey related functions. It does however include many SONET related functions, for example a function to associate a path name (a human readable text string, also referred to as a "trail") with a connection (such as the path 328), and to subsequently monitor the connection based on the associated path name.

In a SONET network, the trail name would be received from the OSS, and the transmitted in the overhead of the SONET signals (user channels) of each lambda channel as the human readable text string.

In the wavekey network 200, there is no user channel overhead capable of carrying the human readable text string in each lambda channel (user channels 310 or 316). Instead, paths (including the path 328) are identified by wavekeys (combinations of dither tones of different frequencies). The controller 322 of the NE 204 (the TL1 gateway 204) thus includes the additional functionality of associating trail names with wavekeys, in effect translating a trail name received from the OSS into a corresponding wavekey.

While only one TL1 gateway (the NE 204 with the management link 218) is shown in the wavekey network 200 for clarity, it is understood that there are preferably more than one TL1 gateway (NE with a management link) in an actual wavekey network, for reliability.

OSPF Packet

The format of a typical OSPF packet 400 is shown in FIG. 4. The OSPF packet 400 comprises an IP header 402, an OSPF header 404, and one or more OSPF data fields 406. The IP header 402 includes a Protocol Field 408 identifying the packet as an OSPF packet. The OSPF header 404 includes an OSPF Packet Type field 410 identifying the type of the OSPF data 406. The type of OSPF data of concern in the present invention includes "Link State Advertisements" (LSA), and the first OSPF data field 406 is shown as an LSA 412. Also shown in FIG. 4 in dotted outline is an Ethernet header 414 representing a layer 2 protocol header. OSPF packets may be carried over (encapsulated in) different layer 2 protocols. Ethernet is the preferred layer 2 protocol of the embodiment of the invention. The OSPF protocol is described in the IETF "Request For Comment" (RFC) document "OSPF Version 2" RFC2328.

A number of different types of LSA are defined in the RFC2328. Additional types of LSAs are described in the IETF documents RFC2370 ("The OSPF Opaque LSA Option") and RFC3630 ("Traffic Engineering (TE) Extensions to OSPF Version 2").

The format of a specific type of opaque LSA (a Traffic Engineering LSA (TE-LSA)) 500 of the prior art is shown in FIG. 5.

The TE-LSA 500 comprises an LSA header 502, and the LSA payload 504.

The LSA header 502 of the TE-LSA 500 comprises a number of fields. The fields of particular interest in this application are shown in bold, and with reference numerals. The other fields are shown in italics only.

The fields of the LSA header 502 of the TE-LSA 500 include:
- an Age field;
- an Options field;
- a Type Field 506, set to the value of "10", indicating an opaque Traffic Engineering LSA;
- a Link-State Identifier (ID) field divided into an Opaque type field 508 and a type-specific ID 510;
- an Advertising Router field;
- a LS Sequence field;
- a Checksum field; and
- a Length field.

These fields are described in detail in the IETF documents cited above.

The LSA payload 504 comprises one or more Type/Length/Value (TLV) blocks 511, where each TLV block 511 comprises a TLV Type field 512, a TLV Length field 514, and a variable length TLV Value field 516. The TLV Length field 514 specifies the length of the TLV Value field 516. The TLV Value field 516 contains information, the structure of which depends on the contents of the TLV Type field 512.

According to current practice [see reference RFC3630], a TE-LSA contains only a single Type/Length/Value (TLV) block 511 (a "top level" TLV block). TLV blocks may be nested. The TLV Value field 516 of the top level TLV block 511 shown in FIG. 5, may itself contain one or more TLV blocks, each having a sub-TLV type field, a sub-TLV length field and a sub-TLV value field. The sub-TLV value field may then again contain TLV blocks, and so on.

The current practice provides two top-level TLV types, a "Router Address TLV" and a "Link TLV". Within these top level TLVs are provided a number of sub-TLV types.

It should be noted that the TLV type identifiers and sub-TLV type identifiers are assigned by the Internet Assigned Numbers Authority (IANA), and additional identifiers (numbers) may be assigned through standards setting processes.

While the OSPF protocol was originally designed to support routing, and more recently to support network traffic engineering, the availability of standard "opaque" LSAs suggests that other information in the form of TLV blocks 511 may also be distributed using the OSPF protocol.

As part of the embodiment of the invention, the OSPF protocol is extended and used to distribute additional information, as described in detail below. The additional information will be contained in TLV blocks of TE-LSAs (vendor specific LSAs). In order to differentiate the vendor specific LSAs from the standard TE-LSAs of the prior art, yet remain compatible with these, two schemes for creating vendor specific LSAs are defined, a "Vendor Attribute TLV" as a sub-TLV of a standard TE-LSA (a scheme "A") and a "Vendor Attribute LSA' as a new type of TE-LSA incorporating a "Vendor Attribute TLV" (a scheme "B").

Vendor Attribute TLV

FIG. 6 shows a Vendor Attribute TLV 600 (similar to the TLV block 516 in the TE-LSA 500, but with an added field), comprising a Vendatt-type field 602, a Vendatt-length field 604, an enterprise code field 606, and a variable length Vendatt-Data section 608.

The enterprise code field 612 is set to the Organizationally Unique Identifier (OUI, or vendor's code) of the vendor. Organizationally Unique Identifiers are defined in the IETF document "Structure of Management Information (SMI)" RFC2578. For example the SMI-OUI of the applicant's organization is hexadecimal 0x00001D3B. In this manner, the Vendatt-Data section 608 of the Vendor Attribute TLV 600 may contain any vendor specific information, formatted and defined according to the vendor's design, and easily distinguished from another Vendor Attribute TLV 600 of a different vendor.

Scheme "A"

In this embodiment, the distribution of vendor specific data, using the OSPF protocol, is enabled by the definition of one additional sub-TLV type identifier for each of the standard two top level TLV types (the Router Address TLV and the Link TLV, described in RFC3630).

This allows the Value field 516 of a standard TLV 504 of a standard TE-LSA 500, to carry a sub-TLV that is a Vendor Attribute TLV 600. The Vendatt-type field 602 of the Vendor Attribute TLV 600 is set to one of the two additional sub-TLV type identifiers that would be defined (standardized).

The embodiment of the Vendor Attribute TLV 600 thus defines an encoding that uniquely identifies the organization, so that there is no risk of collision in picking a type identifier value from the type range reserved for vendor specific extensions. The unique identifier specified (in the enterprise code field 606) to distinguish a particular vendor, is the vendor's or the organization's SMI Network management enterprise code. This encoding method for vendor specific data simplifies the process of defining the Vendor Attribute TLV 600 by eliminating the need of an Expert Review and the redundant registration of the vendor with the IANA (which would be required if a separate sub-TLV type identifier had to be allocated for every vendor). Only the two additional sub-TLV type identifiers need to be standardized and registered.

The Vendor Attribute TLV 600 can be used as a sub-TLV in the Router Address TLV (top level type field 512 in FIG. 5 set to "1"). The (as yet unassigned) sub-TLV type identifier "1" may be assigned for the Vendatt-type field 602.

The Vendor Attribute TLV 606 can also be used as a sub-TLV in the Link TLV (top level type field 512 in FIG. 5 set to "2"). In this case, the (as yet unassigned) sub-TLV type identifier "17" may assigned for the Vndatt-type field 602.

The Scheme "A" is also described in the IETF draft "draft-udo-ospf-Vendatt-00.txt" which is included herein by reference.

Scheme "B"

While the scheme "A" is the preferred embodiment for a generic vendor specific capability to be standardized (relying only on two sub-TLV type identifiers to be assigned by the IANA), a Scheme "B" is provided as an alternative embodiment that does not rely on standardization.

In the Scheme "B", the Vendor Attribute TLV 600 is used as the top level TLV in an LSA, i.e. at the level of the TLV block 516 in the TE-LSA 500. This is the basic idea behind a new "Vendor Attribute LSA". However, in order to distinguish the "Vendor Attribute LSA" more securely from standard TE-LSAs (and possible other vendors' non-standard LSAs), an additional safeguard is proposed. It is not sufficient to rely simply on selecting a different TLV type identifier, since a number of organizations already use identifiers that are not assigned, and may be unpublished.

Thus in order to reduce the risk of false detection, a Vendor Attribute LSA 700 (shown in FIG. 7) is defined.

The Vendor Attribute LSA 700 is similar to the standard TE-LSA 500, with different elements indicated in bold lettering. The Vendor Attribute LSA 700 comprises an LSA header 702, the LSA header 702 comprising a number of fields unchanged from the standard TE-LSA 500 (indicated in italics), and a Vendatt Link State ID field 704 (in place of the Opaque-Type field 508, and the Type-Specific ID 510 of the standard TE-LSA 500). The Vendor Attribute LSA 700 further comprises an instance of the Vendor Attribute TLV 600 (in place of the TLV block 511 of the standard TE-LSA 500).

The Vendor Attribute LSA 700 is thus distinguished from the standard TE-LSA 500 in two ways:

the value assigned to the Vendatt Link State ID field 704 is chosen to be different from the standard values of the Opaque-Type field 508, and of the Type-Specific ID 510 of the standard TE-LSA 500; and the top level TLV is a Vendor Attribute TLV 600 comprising an enterprise code field 606 identifying the vendor, as described above (FIG. 6).

Two instance types of the Vendor Attribute LSA 700 that have been defined for use in a wavekey network of the applicant, a Wavekey LSA and a Node Name LSA, will now be described as examples of the application of the Vendor Attribute LSA 700 concept.

Wavekey LSA

A Wavekey LSA 800 is illustrated in FIG. 8. The Wavekey LSA 800 is an instance type of the Vendor Attribute LSA 700 in which the LSA header 702 includes the Vendatt Link State ID field 704 having the assigned value of hexadecimal value 0x81000008. The Wavekey LSA 800 further comprises an instance of a Vendor Attribute TLV 600 in which the Vendatt-type field 602 has the value of 1, the enterprise code field 606 has the hexadecimal value 0x00001D3B, and the Vendatt-Data section 608 comprises a nested set of TLVs. The value of the enterprise code field 606 is the SMI-OUI of the applicant's organization, since the wavekey concept is specific to this vendor.

The Vendatt-Data section 608 is itself a second level TLV having a sub-type field 802 (set to the value 2), a sub-length field 804, and a sub-data section 806.

The sub-data section 806 in turn is a third level TLV (a "Wavekey TLV" 806), structured in the format of a Vendor Attribute TLV 600, comprising a Vendatt-type field 602 (labeled a "subsub-type" 808 in FIG. 8, set to the value 253), a Vndatt-length field 604 (labeled a "subsub-length" 810 in FIG. 8), and a second enterprise code field 812, also set to the hexadecimal value 0x00001D3B.

The Vendatt-Data section 608 of the Wavekey TLV 806 is labeled a "Wavekey-Data" section 814 in FIG. 8, and includes a number of fourth level TLV blocks containing wavekey information. The wavekey-data section 814 is illustrated in further detail in FIG. 9 below.

The Wavekey LSA 800 illustrated in FIG. 8 comprises a number of fields indicating the lengths of certain blocks, including a Length field 816 in the LSA header 702, the Vendatt-length field 604, the sub-length field 804, and the subsub-length field 810. The values to be set in these fields all depend on the length of the wavekey-data section 814 in the following way:

Let "L" be the actual length of the wavekey-data section 814.

Then:

the subsub-length field 810 is set to L+4 (accounting for the additional length of the second enterprise code field 812);

the sub-length field 804 is set to L+8 (accounting for the additional lengths of the subsub-type field 808 and subsub-length field 810);

the Vendatt-length field 604 is set to L+16 (accounting for the additional lengths of the enterprise code field 606 as well as lengths of the sub-type field 802 and the sub-length field 804);

the length field 816 in the LSA header 702 is set to L+40 (accounting for the additional lengths of the Vendatt-type field 602 and the Vendatt-length field 604, as well as the complete length of the LSA header 702 itself).

The values of the other fields of the LSA header 702 (shown in italics) are set according to standard OSPF practice.

Wavekey Data Section

The wavekey-data section 814 is shown in FIG. 9. It comprises a number of TLV blocks, similar to the standard TLV block 511 (see FIG. 5). Each TLV block has a type field, a length field, and a data section, where the type fields are shown with specific type identifiers indicated, and the data sections are labeled so as to indicate the nature of data being carried. The data carried in the wavekey-data section 814 relates to a single lambda channel on a specific optical WDM link (e.g. one of the user data channels 310 of the WDM link 210 in FIG. 3):

a TLV block 820, type 1, comprising a Wavekeys section 822 listing the frequencies of the dither tones of the wavekey;

a TLV block 824, type 3, comprising a Location section 826 listing the physical shelf, card slot, and port location of the equipment terminating the WDM link;

a TLV block 828, type 4, comprising a Wavelength section 830 indicating the wavelength identifier of the lambda channel;

a TLV block 832, type 5, comprising a Trail section 834 which includes the path name (trail name) assigned to the lambda channel;

a TLV block 836, type 6, comprising a Direction section 838 indicating the direction of the optical link, for example East or West in an optical ring; and a TLV block 840, type 7, comprising a State section 842 indicating the state of the lambda channel, for example working or non-working.

The length fields of each of the TLV blocks 820, 824, 828, 832, 836, and 840 contain the lengths (number of octets) of the corresponding data sections (822, 826, 830, 834, 838, and 842).

Node Name LSA

A Node Name LSA 900 is illustrated in FIG. 10. The overall format of the Node Name LSA 900 is very similar to the format of the Wavekey LSA 800; fields that are unchanged are shown in italic lettering, while only the new or changed fields are shown in bold. The Node Name LSA 900 is an instance of the Vendor Attribute LSA 700 in which the LSA header 702 includes the Vendatt Link State ID field 704 having the assigned value of hexadecimal value 0x81FFFFFF (which differs from that of the Wavekey LSA 800). The Node Name LSA 900 further comprises a specific instance of a Vendor Attribute TLV 600 in which the Vendatt-type field and the enterprise code field are unchanged from the Wavekey LSA 800. The Vendatt-Data section 608 similarly comprises a nested set of TLVs.

The Vendatt-Data section 608 is itself a second level TLV having a sub-type field 802 (set to the value 1), a sub-length field 804, and a sub-data section 902.

The sub-data section 902 in turn comprises an "advertising router ID" field 904 and a third level TLV (a "Node Name TLV" 906). The node name TLV 906 is structured in the format of a Vendor Attribute TLV 600, comprising a Vendatt-type field 602 (labeled a "subsub-type" 808 in FIG. 8 set to the value 253 and unchanged in FIG. 10), a Vendatt-length field 604 (labeled a "subsub-length" 810 in FIG. 8 and also unchanged in FIG. 10), and a second enterprise code field 812 (FIG. 8) also unchanged in FIG. 10.

The second Vendatt-Data section 608 (labeled a "Node Name Data" section 908 in FIG. 10) includes a number of fourth level TLV blocks containing node name information. The node name data section 908 is illustrated in further detail in FIG. 11 below.

The Node Name LSA 900 comprises a number of fields indicating the lengths of certain blocks, including the Length field 816 in the LSA header 702, the Vendatt-length field 604, the sub-length field 804, and a subsub-length field 910. The values to be set in these fields all depend on the length of the node name data section 908 in the following way:

Let "K" be the actual length of the node name data section 908.

Then:
  the subsub-length field 910 is set to K+4 (accounting for the additional length of the second enterprise code field);
  the sub-length field 804 is set to K+12 (accounting for the additional length of the advertising router ID field 904 as well as the lengths of the subsub-type field and the subsub-length field 910);
  the Vendatt-length field 604 is set to K+20 (accounting for the additional lengths of the first enterprise code field as well as the lengths of the sub-type field 802 and the sub-length field 804);
  the length field 816 in the LSA header 702 is set to K+44 (accounting for the additional lengths of the Vendatt-type field and the Vendatt-length field 604, as well as the complete length of the LSA header 702 itself).

Node Name Date Section

The node name data section 908 is shown in FIG. 11. It comprises two TLV blocks, similar to the standard TLV block 511 (see FIG. 5). Each TLV block has a type field, a length field, and a data section, where the type fields show specific type identifiers, and the data sections are labeled so as to indicate the nature of data being carried. The data relates to the node sending the LSA (the advertising router, as specified in the advertising router ID field 904, for example the node NE-A 202 of FIG. 3):
  a TLV block 911, type 1, comprising a Node Name section 912 which includes a text string bearing the name of the node; and
  a TLV block 914, type 2, comprising a Software Version section 916 which includes a text string characterizing the current software load of the node.

The length fields of each of the TLV blocks 911 and 914 contain the lengths (number of octets) of the corresponding data sections (912 and 916).

CONCLUSION

Through the development of a vendor specific protocol element type (the Vendor Attribute TLV) and schemes (the schemes "A" and "B") for incorporating such protocol elements into OSPF LSAs, a method is provided by which (otherwise standard) OSPF can be used to distribute wavekey data and other vendor specific information in an optical network. In this way a distributed database of such information can be created, making it possible to access this information from selected gateway nodes (TL1 gateways) in a manner that permits the optical network to be managed from a conventional OSS, using existing management protocols. Furthermore, the development of the Vendor Attribute TLV for OSPF creates an opportunity for using that protocol (OSPF) to distribute many other types of vendor specific information in a network, including the coexistence of several vendors, each distributing their specific information reliably, and without mutual interference.

We claim:

1. A wavekey network comprising:
  a network controller;
  a plurality of nodes, each node communicating with said network controller through a management link connecting a selected node, among said plurality of nodes, to said network controller, said each node comprising:
    a node controller;
    a respective plurality of access ports; and
    a respective plurality of inter-nodal interfaces;
  and
  a plurality of links, each link connecting inter-nodal interfaces of a respective node pair and supporting optical signals occupying channels of different wavelength bands, said channels comprising:
    a control channel carrying control signals; and
    data channels, each data channel carrying data of a respective connection from an access port of a source node to an access port of a destination node, said each data channel further modulated by a respective wavekey of at least one dither tone;
  said node controller configured to communicate nodal information to said network controller, said nodal information comprising, for each data channel of each link emanating from said each node:
    an identifier of a connection traversing said each data channel;
    an identifier of a central wavelength of said each data channel; and
    an identifier of a current wavekey modulating said central wavelength; and
  said network controller configured to determine continuity of said connection according to nodal information received from all nodes of said plurality of nodes.

2. The wavekey network of claim 1 wherein said nodal information further comprises an identifier of a software version, said identifier including a text string characterizing a current software load of said each node.

3. The wavekey network of claim 1 wherein said identifier of said current wavekey includes identifiers of frequencies of constituent dither tones of said current wavekey.

4. The wavekey network of claim 1 wherein said nodal information further comprises identifiers of structural components of said each node.

5. The wavekey network of claim 1 wherein said node controller of said each node distributes said nodal information to each other node so that each node possesses nodal information of all nodes of said plurality of nodes.

6. The wavekey network of claim 1 wherein said selected node communicates said nodal information of all nodes to said network controller.

7. The wavekey network of claim 5 wherein said node controller is configured to employ a modified version of a standardized protocol for communicating said nodal information to said network controller, said modified version structured to permit inclusion of said nodal information within control packets conforming to said standardized protocol.

8. The wavekey network of claim 7 wherein said node controller selects said standardized protocol to be the Open-Shortest-Path-First protocol.

9. A method of verifying continuity of paths in a wavekey network comprising a plurality of nodes interconnected through a plurality of multi-channel links, each node having a node controller, the method comprising:
- providing a link interface for each multi-channel link among said plurality of multi-channel links;
- sending optical signals occupying channels of different wavelength bands of said each multi-channel link, said optical signals comprising control signals occupying a control channel and data signals occupying data channels of said each multi-channel link;
- sending, over each data channel of said each multi-channel link, data of a respective connection originating from an access port of a source node and terminating at an access port of a destination node;
- modulating said each data channel by a respective wavekey of at least one dither tone;
- distributing, by said node controller, nodal information to each other node, said nodal information comprising:
  - an identifier of a respective connection traversing each data channel of each link emanating from said each node;
  - an identifier of a central wavelength of said each data channel; and
  - an identifier of a current wavekey modulating said central wavelength; and
- communicating to a network controller, from a gateway node selected from among said plurality of nodes, nodal information pertinent to said each node to enable said network controller to determine continuity of said respective connection.

10. The method of claim 9 further comprising said node controller inserting in said nodal information an identifier of a current software version, said identifier including a text string characterizing a current software load of said each node.

11. The method of claim 9 wherein said identifier of said current wavekey includes identifiers of frequencies of constituent dither tones of said current wavekey.

12. The method of claim 9 further comprising said node controller inserting in said nodal information identifiers of structural components of said each node.

13. The method of claim 9 further comprising said node controller indicating, in said nodal information, a working state of said each data channel.

14. The method of claim 9 further comprising said node controller employing a modified version of a standardized protocol, said modified version enabling inclusion of said nodal information within control packets conforming to said standardized protocol.

15. The method of claim 14 further comprising selecting said standardized protocol to be the Open-Shortest-Path-First protocol.

16. A node in a wavekey network, said node comprising:
- a node controller;
- a plurality of access ports; and
- a plurality of link interfaces, each link interface coupled to a link to another node of said wavekey network, said link supporting optical signals occupying channels of different wavelength bands, said channels comprising:
  - a control channel carrying control signals; and
  - data channels, each data channel carrying data of a respective connection originating from an access port of a source node and terminating at an access port of a destination node, said each data channel further modulated by a respective wavekey of at least one dither tone;
- said node controller configured to communicate nodal information through said control channel, said nodal information comprising, for each data channel of said link:
  - an identifier of a connection traversing said each data channel;
  - an identifier of a central wavelength of said each data channel; and
  - an identifier of a current wavekey modulating said central wavelength.

17. The node of claim 16 further comprising a medium for storing other nodal information received from other nodes of said wavekey network.

18. The node of claim 16 further comprising an interface to a management link connecting to a network controller of said wavekey network.

19. The node of claim 16 wherein said node controller employs a modified version of a standardized protocol for communicating said nodal information along said link, said modified version structured to permit inclusion of said nodal information within control packets conforming to said standardized protocol.

20. The node of claim 16 wherein said nodal information further comprises:
- data characterizing a current software load of said each node; and
- identifiers of structural components of said each node.

* * * * *

UNITED STATES PATENT AND TRADEMARK OFFICE
CERTIFICATE OF CORRECTION

| | | |
|---|---|---|
| PATENT NO. | : 7,827,308 B2 | Page 1 of 1 |
| APPLICATION NO. | : 10/733327 | |
| DATED | : November 2, 2010 | |
| INVENTOR(S) | : Neustadter et al. | |

It is certified that error appears in the above-identified patent and that said Letters Patent is hereby corrected as shown below:

Column 14, line 56, "claim 1" is corrected to read as --claim 5--.

Signed and Sealed this

Third Day of May, 2011

David J. Kappos
*Director of the United States Patent and Trademark Office*